United States Patent
Aoki et al.

(10) Patent No.: US 6,588,990 B2
(45) Date of Patent: Jul. 8, 2003

(54) MILLING CUTTER

(75) Inventors: Taiitsu Aoki, Akashi (JP); Hiroshi Ikeuchi, Akashi (JP); Yoshihiko Kimura, Yuuki-gun (JP)

(73) Assignees: MMC Kobelco Tool Co., Ltd., Hyogo (JP); Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/849,277

(22) Filed: May 7, 2001

(65) Prior Publication Data

US 2001/0051078 A1 Dec. 13, 2001

(30) Foreign Application Priority Data

May 9, 2000 (JP) ........................................ 2000-135929

(51) Int. Cl.[7] ................................................ B26D 1/12
(52) U.S. Cl. ........................................... 407/53; 407/61
(58) Field of Search ..................... 407/53, 61

(56) References Cited

U.S. PATENT DOCUMENTS 4,597,695 A  *  7/1986  Johnson ..................... 407/113
5,188,488 A  *  2/1993  Nakayama et al. ........... 407/54
5,190,420 A  *  3/1993  Kishimoto et al. ........... 407/54
5,201,619 A  *  4/1993  Yodoshi ..................... 407/54

FOREIGN PATENT DOCUMENTS

| EP | 0 404 298 A1 | 12/1990 |
| EP | 0 456 253 A1 | 11/1991 |
| JP | 3-26413 | 2/1991 |
| JP | 4-53615 | 2/1992 |
| JP | 07178612 | 7/1995 |

* cited by examiner

*Primary Examiner*—A. L. Wellington
*Assistant Examiner*—Dana Ross
(74) *Attorney, Agent, or Firm*—Rader, Fishman & Grauer PLLC

(57) ABSTRACT

The present invention is for providing a milling cutter which can provide for both an improvement in sharpness and a retention of cutting edge strength, while making the transverse cross-section an easily manufactured polygon shape. The milling cutter with a plurality of peripheral cutting edges (12) has a polygon shape transverse cross-section. The polygon is a convex polygon with one more apex point (13) existing between apex point pairs constituting the peripheral cutting edges with an apex angle greater than that of the apex points, and a longer side of the sides on either side of each of the peripheral cutting edges constitutes a rake face (14), while a shorter side constitutes a relief face (16).

7 Claims, 7 Drawing Sheets

MILLING CUTTER

BACKGROUND OF THE INVENTION

1. Field of the Invention

The present invention relates to a milling cutter such as an end mill.

2. Description of the Related Art

Heretofore, as a milling cutter having a plurality of peripheral cutting edges, such as an end mill, various forms are known. However of these, those where the shape of the transverse cross-section (the cross-section perpendicular to the axial direction) is a regular hexagon or a regular square are easy to manufacture due to the simple shape. Hence development of these has been actively promoted (refer for example to Japanese Unexamined Patent Application, First Publication Nos. Hei 3-26413 or 4-53615).

As one example of these, an end mill with a transverse cross-section of a regular hexagon is shown in FIG. 5 and FIG. 6, while an end mill with a transverse cross-section of a regular square is shown in FIG. 7 and FIG. 8. The end mills in these figures have a shank 10, and a cutting part at a tip end thereof. On this cutting part is formed a plurality of peripheral cutting edges 12 along a cylindrical peripheral face, and each peripheral cutting edge 12 is twisted in a helix.

Looking at the cutting part in the transverse cross-section shown in FIG. 6A and FIG. 8A, the respective vertices of the polygons constituting the transverse cross-section constitute the peripheral cutting edge 12, the vicinity of the front side in the tool rotation direction (the cutting direction) of the peripheral cutting edge 12 constitutes a rake face 14 of the peripheral cutting edge 12, and the vicinity of the rearside in the tool rotation direction constitutes a relief face 16. That is to say, the rake face 14 of one peripheral cutting edge 12 is also used a relief face of the adjacent peripheral cutting edge 12 on the front side in the tool rotation direction of that peripheral cutting edge 12.

Consequently, with the end mill having the transverse cross-section of a regular hexagon shown in FIG. 6A, as shown in FIG. 6C, with a rake angle $\alpha$ of each of the peripheral cutting edges 12 of $-60°$, a relief angle $\epsilon$ of $30°$, the wedge angle $\beta$ (the apex angle constituting the peripheral cutting edge 12 in transverse cross-section) becomes $120°$, while with the end mill having the transverse cross-section of a regular square shown in FIG. 8B, as shown in FIG. 8C, with a rake angle $\alpha$ of each of the peripheral cutting edges 12 of $-45°$, a relief angle $\epsilon$ of $45°$, the wedge angle $\beta$ (the apex angle constituting the peripheral cutting edge 12 in transverse cross-section) becomes $90°$.

In the tip of the cutting part, as shown in FIG. 6B and FIG. 8B, when viewed from the tool tip side, there is formed bottom edge rake faces 19 extending in the tool diameter direction so that the apex angles of the two peripheral cutting edges 12 are respectively evenly divided. These bottom edge rake faces 19 extend in approximately parallel directions to the tool axis, with the tips thereof constituting bottom edges 18, and tool tip faces located on the rear side in the tool rotation direction of the bottom edges 18 become bottom edge relief faces 20. Consequently, a wedge angle $\gamma$ of each bottom edge 18 (the apex angle subtending the bottom edge 18 viewed from the tool tip side) become approximately half of the wedge angle $\beta$ of the peripheral cutting edge 12, and with the end mill shown in FIG. 6B, $\gamma=60°$, while with the end mill shown in FIG. 8B, $\gamma=45°$.

Comparing the aforementioned regular hexagon section end mill and the regular square section end mill, for the regular hexagon section end mill, the size of the wedge angle $\beta$ of the peripheral cutting edge is larger ($\beta=120°$) than for the regular square section end mill, and to that extent there is a strengthwise advantage. However on the other hand, the rake angle $\alpha$ of the peripheral cutting edge is much smaller at $-60°$. Therefore there is the disadvantage of inferior sharpness. Conversely, with the regular square section end mill, the rake angle $\alpha$ of the peripheral cutting edge is larger at $-45°$. Therefore, compared to the regular hexagon section end mill, sharpness is excellent. However since the relief angle $\epsilon$ is also large, the wedge angle $\beta$ of the peripheral cutting edge is small ($\beta=90°$). Hence it is difficult to maintain sufficient cutting edge strength, and to that chipping is likely to occur.

That is to say, with the conventional end mill where the transverse cross-section is a regular polygon (the same for other end mills), there is the characteristic that, if the number of vertices, that is the number of peripheral cutting edges, is increased the strength of the peripheral cutting edges is increased, however the sharpness deteriorates, while on the other hand, if the number of peripheral cutting edges is reduced, the sharpness improves, however the strength of the peripheral cutting edges is reduced. Hence there is the problem that it is extremely difficult to improve the sharpness and at the same time to maintain the cutting edge strength.

In particular, as shown in FIG. 6B and FIG. 8B, in an end mill where the bottom edge rake faces 19 are formed so as to equally divide the apex angles of the peripheral cutting edges 12, and the bottom edges 18 are formed in the tips thereof, the wedge angle $\gamma$ of each bottom edge 18 further becomes approximately half the wedge angle $\beta$ of the peripheral cutting edge 12. Hence insufficiency of cutting edge strength at this bottom edge 18 is serious.

SUMMARY OF THE INVENTION

The present invention takes in to consideration such a situation, with the object of providing a milling cutter which can provide for both an improvement in sharpness and a retention of cutting edge strength, while making the transverse cross-section an easily manufactured polygon shape.

As a means for solving the above problems, the present invention, in a milling cutter having a plurality of peripheral cutting edges around a circumferential direction, and with a transverse cross-section shape of a polygon, is constructed such that the polygon is a convex polygon with one more apex point existing between apex point pairs constituting the peripheral cutting edges with an apex angle greater than that of the apex points, and a longer side of the sides on either side of each of the peripheral cutting edges constitutes a rake face, while a shorter side constitutes a relief face.

According to this construction, there is the easily manufactured transverse cross-section shape polygon. However instead of the conventional regular polygon, this is an irregular convex polygon with an apex point existing between apex point pairs constituting the peripheral cutting edge, with an apex angle greater than that of the apex points. Furthermore, the long side of these sides constitutes the rake face, while the short side constitutes the relief face. Therefore, due to the difference in length of these sides (in other words the difference in the apex angles), as the rake angle of each peripheral cutting edge is increased, the relief angle is reduced, and to that extent the wedge angle of the peripheral cutting edges can be kept large. That is to say, it is possible to simultaneously realize both an improvement in sharpness and a retention of cutting edge strength.

For example, in the case where the milling cutter according to the present invention has four peripheral cutting edges (that is, the transverse cross-section shape is an octagon), then with the rake angles of each of the peripheral cutting edges greater than −60° and less than −45° (−60° with the conventional regular hexagon milling cutter), the apex angle of each of the peripheral cutting edges in transverse cross-section can be an angle greater than 120° and less than 135° (120° with the conventional regular hexagon milling cutter). That is to say, while keeping the edge angle of the peripheral cutting edge the same as or greater than for the conventional regular hexagon milling cutter, a greater rake angle can be set.

According to the present invention where the edge angle of the peripheral cutting edge can be kept large in this way, then in a milling cutter (typically an end mill) where a bottom edge is formed not only on the peripheral cutting edge but also on the tip end, a more noticeable affect is realized.

For example, in a milling cutter (end mill) where a bottom edge rake face is formed along a tool diameter direction so that an apex angle of the peripheral cutting edge viewed from the tool tip end is divided, and a bottom edge is formed at the tip end of this bottom edge rake face, the wedge angle of the bottom edge becomes an angle which divides the edge angle of the peripheral cutting edge, and since this becomes even smaller than the edge angle of the peripheral cutting edge, then particularly at the bottom edge chipping is likely to occur. Therefore conventionally in order to raise the strength of the bottom edge, there was the situation where the bottom edge must be formed at a position away from the tool tip central position. However by keeping the edge angle of the peripheral cutting edge large as with the present invention, the wedge angle of the bottom edge can also be kept large. Hence even if the bottom edge is formed at a position close to the tool tip central position, the strength of this cutting edge can be kept high. Consequently, also at the tool tip center part it is possible to maintain a good sharpness.

Furthermore, if the construction is such that the bottom edge rake face is directed rearward from the bottom cutting edge and extends approximately parallel to the tool axial direction, and extends in the rearward direction in a gradually separating direction from the peripheral cutting edge, the gap of the bottom edge rake face and the peripheral cutting edge fulfills a so called honing function (chamfering) so that a chipping prevention effect is further enhanced.

DETAILED DESCRIPTION OF THE INVENTION

A preferred embodiment of the present invention is described based on FIG. 1 through FIG. 4. This embodiment discloses a milling cutter with a peripheral cutting edge formed on an approximately cylindrical peripheral face, and in addition a bottom edge is formed on the tip end. However the present invention is not limited to such an end mill, and for example can also be applied to a milling cutter without a bottom edge. Furthermore, while being for an end mill, this is not limited to the square end mill shown in the figure, and may be applied to various end mills such as a ball end mill or a taper end mill.

Figure 1:
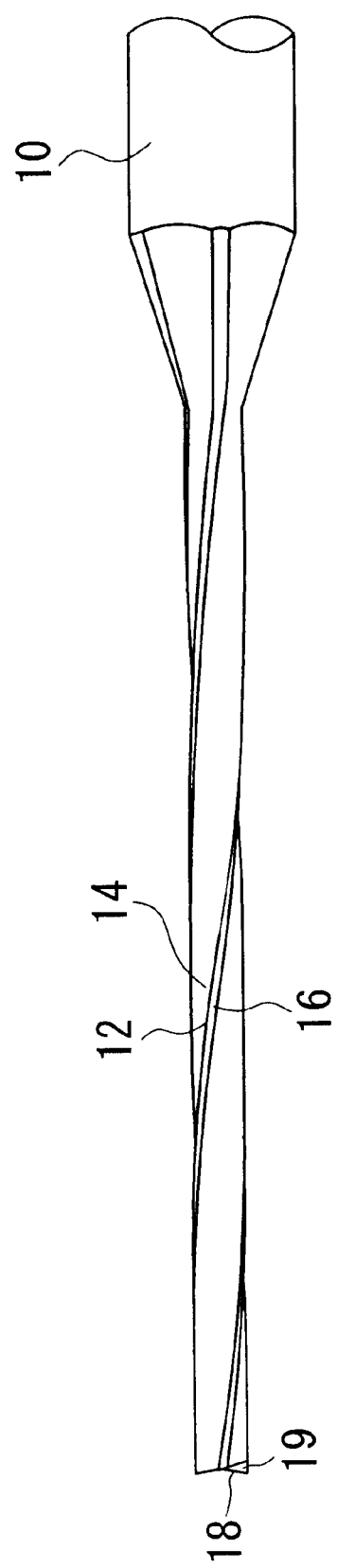
FIG. 1 is a side view of an end mill according to an embodiment of the present invention.

The end mill shown in FIG. 1 has a shank 10, and a cutting part at a tip end thereof. On this cutting part is formed a plurality (four in the figure) of peripheral cutting edges 12 along an approximately cylindrical peripheral face, and each peripheral cutting edge 12 is twisted in a helix.

Figure 2A:
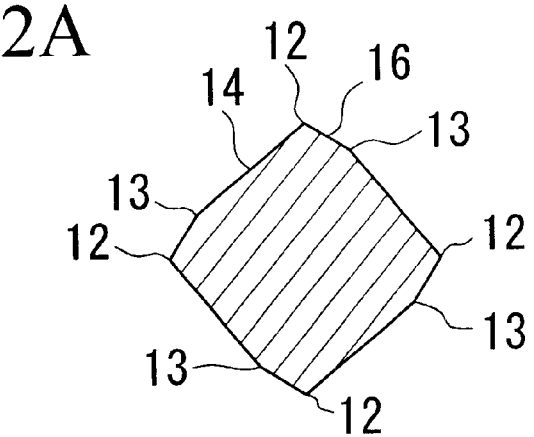
FIG. 2A is a transverse cross-section of the end mill shown in FIG. 1.

The transverse cross-section of this cutting part, as shown in FIG. 2A, constitutes a convex polygon which has in addition to four apex points constituting each of the peripheral cutting edges 12 arranged at equal spacing (90° spacing) in the circumferential direction, one more apex point between these apex point pairs with an apex angle (that is the wedge angle β) greater than that of the apex points. Consequently, this octagon gives a shape where the long side and the short side are arranged alternately, and each peripheral cutting edge 12 is disposed between the long side and the short side. Furthermore, the long side constitutes the rake face 14 of the peripheral cutting edge 12, while the short side constitutes the relief face 16.

That is to say, with this end mill, not all of the eight apex points constitute the peripheral cutting edge 12, but only half of the apex points (the apex points where the apex angle is smaller) constitute the peripheral cutting edge 12.

Figure 2B:
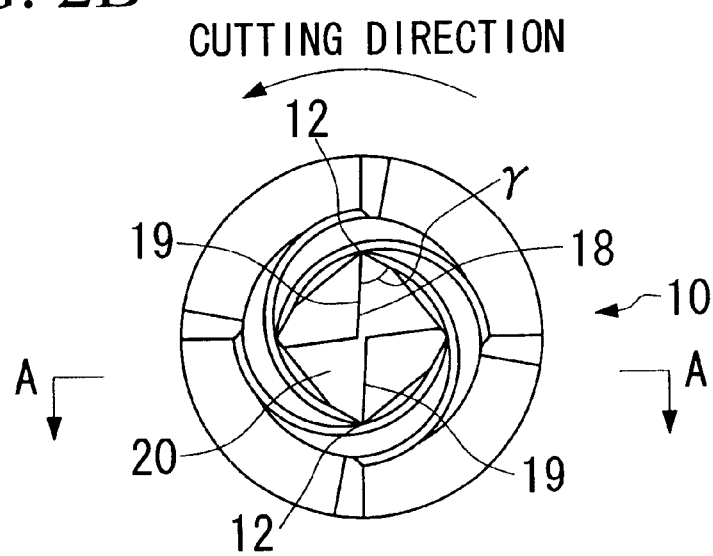
FIG. 2B is a front view of the end mill shown in FIG. 1.

In the tip end of the cutting part, as shown in FIG. 2B, is formed bottom edge rake faces 19 extending in the tool diameter direction so as to respectively divide the apex angles of the two peripheral cutting edges 12 when seen from the tool tip side. These bottom edge rake faces 19 extend in an approximately parallel direction to the tool axis direction, and are formed with bottom edges 18 at the tips thereof, and the tool tip end faces positioned at the rear sides in the tool rotation direction of the bottom edges 18 constitute bottom edge relief faces 20. Consequently, the wedge angle γ of the bottom edge 18 is an angle smaller than the wedge angle β of the peripheral cutting edge 12.

Figure 3A:
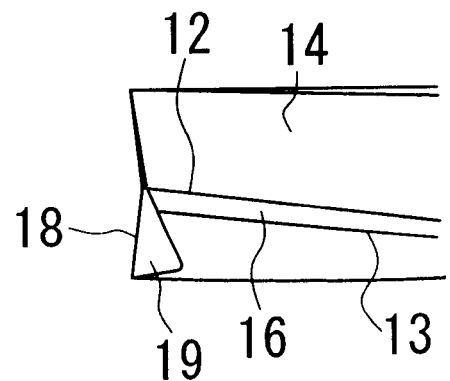
FIG. 3A is a side view of the tip portion of the end mill shown in FIG. 1.
Figure 3B:
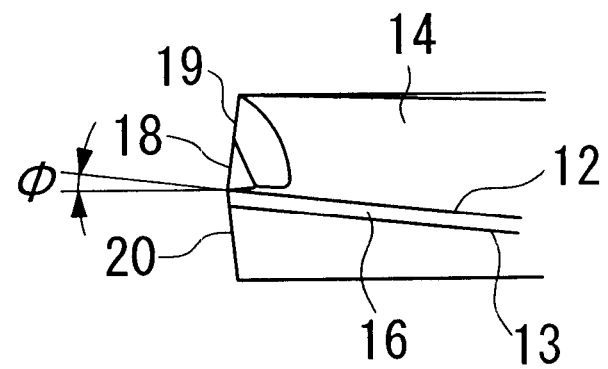
FIG. 3B is an another side view of the tip portion of the end mill shown in FIG. 1.
Figure 4:
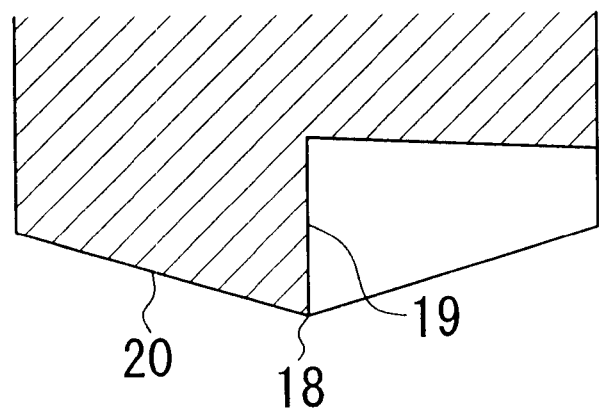
FIG. 4 is a cross-section view on A—A of FIG. 2B.
Figure 5:
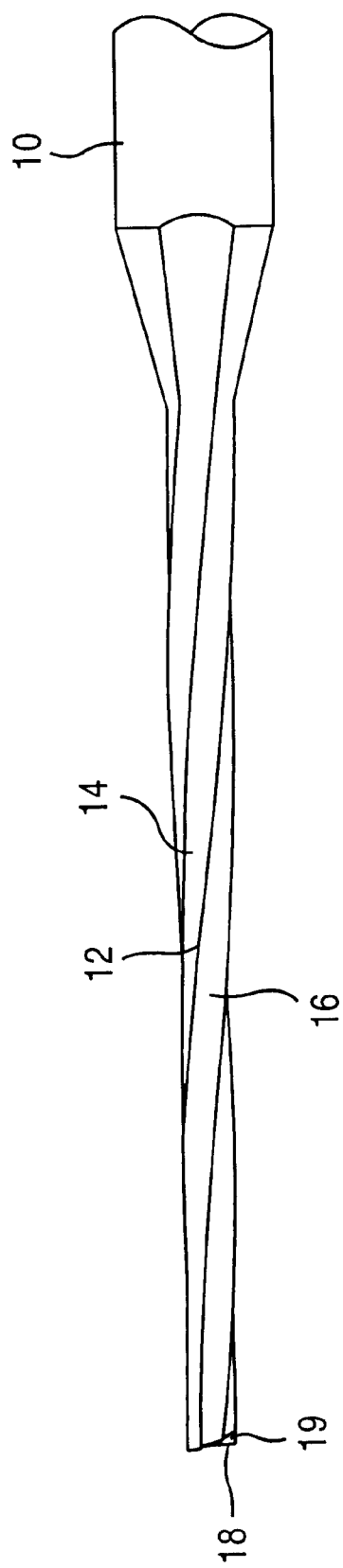
FIG. 5 is a side view of a conventional end mill where the transverse cross-section is a regular hexagon.
Figure 6A:
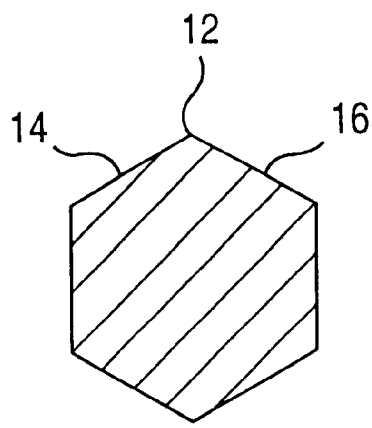
FIG. 6A is a transverse cross-section of the end mill shown in FIG. 5.
Figure 6B:
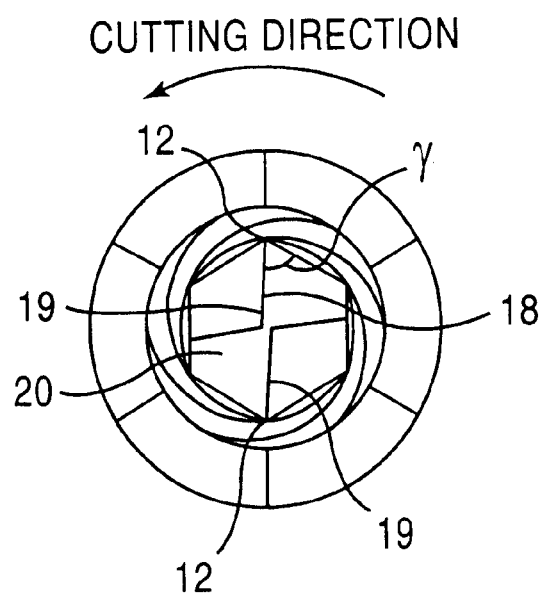
FIG. 6B is a front view of the end mill shown in FIG. 5.
Figure 6C:
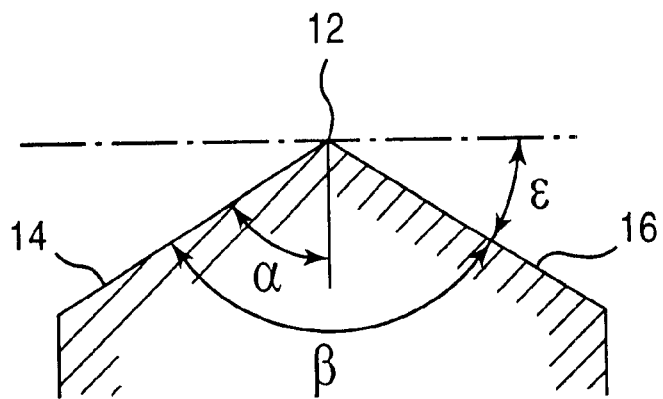
FIG. 6C is an enlarged view in the vicinity of the peripheral cutting edge of FIG. 6A.
Figure 7:
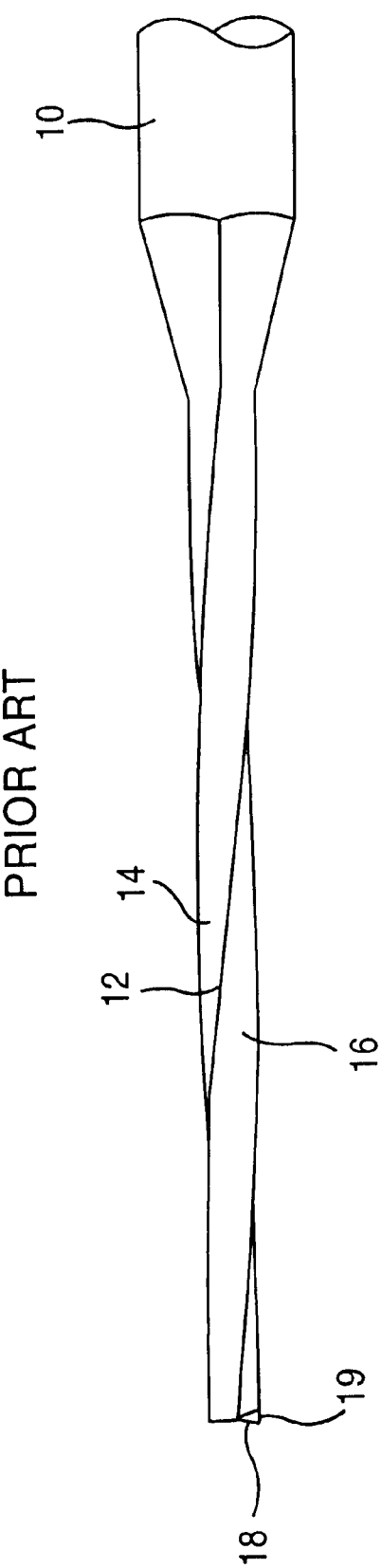
FIG. 7 is a side view of a conventional end mill where the transverse cross-section is a regular square.
Figure 8A:
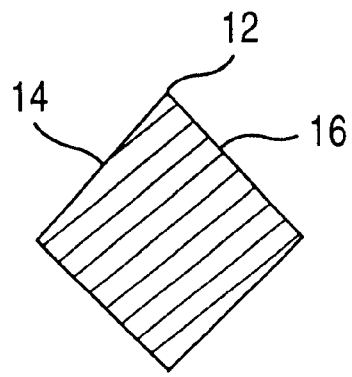
FIG. 8A is a transverse cross-section of the end mill shown in FIG. 7.
Figure 8B:
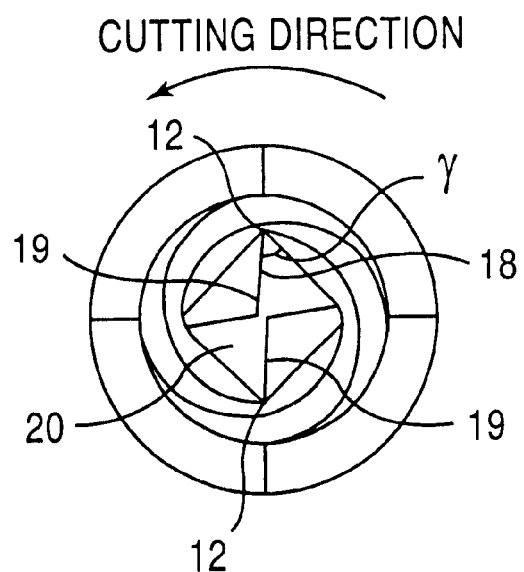
FIG. 8B is a front view of the end mill shown in FIG. 7.
Figure 8C:
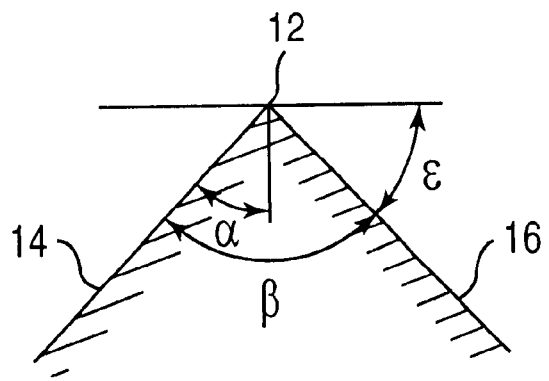
FIG. 8C is an enlarged view in the vicinity of the peripheral cutting edge of FIG. 8A.

Furthermore, as shown FIG. 3B, the bottom edge rake face 19 and the peripheral cutting edge 12 when seen from the side, form an angle φ approximately equal to the twist angle of the peripheral cutting edge 12, and the bottom edge rake face 19 and the peripheral cutting edge 12 gradually separate in the rearward direction at a proportion approximately equal to tan φ).

Figure 2C:
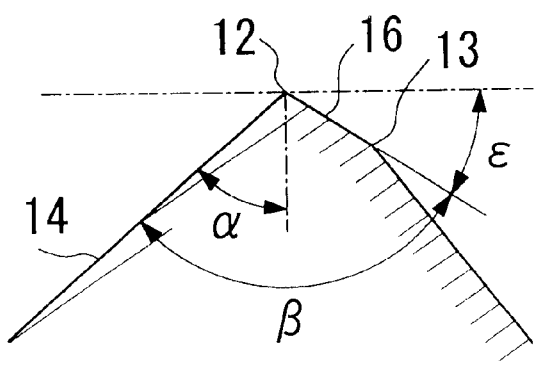
FIG. 2C is an enlarged view in the vicinity of the peripheral cutting edge of FIG. 2A.

With this milling cutter, one more apex point 13 with a large apex angle exists between the apex point pairs constituting the peripheral cutting edge 12, and the long side of the sides on either side of the peripheral cutting edge 12 constitutes a rake face 14, while the short side constitutes a relief face 16. Therefore by making the length ratio of the long side to the short side larger, then as shown in FIG. 2C, as the rake angle α of each of the peripheral cutting edge 12 is increased, the relief angle ε can be kept small, and as a result, the wedge angle β of the peripheral cutting edge 12 can be kept large.

For example, as shown in the same figure, in the case of an end mill with an octagonal transverse cross-section with four peripheral cutting edges 12, the rake angle α is larger than the rake angle (=−60°) of the conventional regular hexagonal cross-section end mill, and yet, the wedge angle β of the peripheral cutting edge 12 can be kept at an angle greater than the wedge angle (=120°) of this regular hexagonal cross-section end mill. Hence it is possible to retain both the sharpness and the cutting edge strength.

More specifically, in the case of the construction shown in the figure, it is possible to increase the rake angle α of the peripheral cutting edge 12 in a range less than −45° (for example the peripheral cutting edge rake angle a of a regular square cross-section end mill), and it is possible to increase the wedge angle β of the peripheral cutting edge 12 in a range less than 135° (that is, a wedge angle of a regular octagon cross-section end mill).

Furthermore, with the retention of the wedge angle β of the peripheral cutting edge, the bottom edge wedge angle γ being the angle dividing this wedge angle β can also be kept large, thus realizing a significant effect particularly in preventing chipping of the bottom edge 18.

Furthermore, with this embodiment, as shown in FIG. 3B, the construction is such that the set angle φ is formed between the bottom edge rake face 19 and the peripheral cutting edge 12, and to that extent, the bottom edge rake face 19 and the peripheral cutting edge 12 gradually separate toward the rearward direction. Therefore the gap serves the role of a so-called honing (chamfering), and the effect of preventing chipping of the cutting tip is further increased.

With this invention, the specific number of the peripheral cutting edges 12 is not limited and may be for example three or five. In this case also, the polygon shape may be made with one more apex point with a larger apex angle existing between the apex point pairs (preferably apex points arranged with equal spacing in the circumferential direction) constituting the peripheral cutting edges 12, and the longer side of the sides on either side of each of the apex points made the rake face, while the shorter side is made the relief.

Furthermore, with this example, the peripheral cutting edge 12 is shown as one twisted in a helix, however the present invention can also be applied to milling cutters where the peripheral cutting edge is not twisted.

Moreover, with the present invention, the tool material is not limited, and a generally used tool material such as a cemented carbide or high speed steel may be directly applied. Furthermore, the tool dimensions and the peripheral cutting edge length can be suitably selected according to various parameters such as the material to be cut. Moreover, it is needless to say that coating the cutting edge face with a hard coating is effective.

EXAMPLES

In an end mill of 2 mm diameter, the transverse cross-section shape is the convex octagon shown in FIG. 2A, the apex angle of each of the peripheral cutting edges 12 is 126°, the apex angles of the other apex points 13 is 144°, the length of the long side (that is, the rake face 14) is 1.26 mm, and the length of the short side (that is, the relief face 16) is 0.25 mm. Together with this example, the respective parameters of a conventional example 1 (regular hexagon cross-section) and a conventional example 2 (regular square cross-section) are shown in the for bottoming Table 1.

TABLE 1

|  | Present example | Conventional example 1 | Conventional example 2 |
| --- | --- | --- | --- |
| Transverse cross-section shape | FIG. 2A | Regular hexagon | Regular square |
| Cutting angle α of peripheral cutting edge | −51° | −60° | −45° |
| Relief angle ε of peripheral cutting edge | 15° | 30° | 45° |
| Wedge angle β of peripheral cutting edge | 126° | 120° | 90° |
| Wedge angle γ of bottom edge | 75° | 60° | 45° |

As is clear from the table, according to the present example, while increasing the cutting angle α of peripheral cutting edge to close to the level for a regular square cross-section face of the conventional example 2 (α=−51°), it is possible to maintain the wedge angle β of the peripheral cutting edge and the wedge angle γ of the bottom edge which are greater than for the regular hexagon cross-section end mill of the conventional example 1. In particular, compared to the conventional examples 1 and 2, the relief angle ε of the present example is very small, and this greatly contributes to retaining the wedge angles β and γ.

What is claimed is:

1. A milling cutter, comprising:
   a milling cutter body having a plurality of peripheral cutting edges and a plurality of non-cutting edges disposed around a circumferential cutting direction, and with a transverse cross-sectional shape of a convex polygon, wherein said convex polygon has in cross-section a plurality of cutting apex points defined by respective ones of the plurality of cutting edges and a plurality of non-cutting apex points defined by respective ones of the plurality of non-cutting edges with each cutting apex point disposed between consecutive ones of the non-cutting apex points and connected to one non-cutting apex point by a rake face in the circumferential cutting direction and connected to the other non-cutting apex point by a relief face in a direction opposite the circumferential cutting direction, the rake face being longer than the relief face as viewed in cross-section.

2. A milling cutter according to claim 1, having four peripheral cutting edges, and a cutting angle of each of said peripheral cutting edges is an angle greater than −60° and less than −45°, and an apex angle of each of said peripheral cutting edges in transverse cross-section is greater than 120° and less than 135°.

3. A milling cutter according to claim 1, wherein a bottom edge rake face is formed along a tool diameter direction so that an apex angle of said peripheral cutting edge viewed from a tip end thereof is divided, and a bottom edge is formed at the tip end of this bottom edge rake face.

4. A milling cutter according to claim 2, wherein a bottom edge rake face is formed along a tool diameter direction so that an apex angle of said peripheral cutting edge viewed from a tip end thereof is divided, and a bottom edge is formed at the tip end of this bottom edge rake face.

5. A milling cutter according to claim 3, wherein said bottom edge rake face is directed rearward from said bottom cutting edge and extends approximately parallel to the tool axial direction, and extends in the rearward direction in a gradually separating direction from said peripheral cutting edge.

6. A milling cutter according to claim 4, wherein said bottom edge rake face is directed rearward from said bottom cutting edge and extends approximately parallel to the tool axial direction, and extends in the rearward direction in a gradually separating direction from said peripheral cutting edge.

7. A milling cutter according to claim 1, wherein a non-cutting apex angle formed between the rake face and the relief face relative to the non-cutting apex point is less than 180° and is greater than a cutting apex angle formed between the rake face and the relief face relative to the cutting apex point.

* * * * *